(12) United States Patent
Nyberg et al.

(10) Patent No.: US 7,565,797 B2
(45) Date of Patent: Jul. 28, 2009

(54) SYSTEMS AND METHODS FOR VARYING THE THRUST OF ROCKET MOTORS AND ENGINES WHILE MAINTAINING HIGHER EFFICIENCY USING MOVEABLE PLUG NOZZLES

(75) Inventors: Donald Gerrit Nyberg, Redmond, WA (US); Thomas Adrian Groudle, Redmond, WA (US); Richard Doyle Smith, Kirkland, WA (US)

(73) Assignee: GHKN Engineering LLC, Redmond, WA (US)

( * ) Notice: Subject to any disclaimer, the term of this patent is extended or adjusted under 35 U.S.C. 154(b) by 514 days.

(21) Appl. No.: 11/066,412

(22) Filed: Feb. 25, 2005

(65) Prior Publication Data

US 2005/0188677 A1  Sep. 1, 2005

Related U.S. Application Data

(60) Provisional application No. 60/547,959, filed on Feb. 27, 2004.

(51) Int. Cl.
F02K 9/00 (2006.01)
(52) U.S. Cl. .......................... 60/253; 60/200.1; 60/242
(58) Field of Classification Search ............... 60/242, 60/200.1, 253, 233, 257, 258
See application file for complete search history.

(56) References Cited

U.S. PATENT DOCUMENTS

| | | | | | |
|---|---|---|---|---|---|
| 2,552,497 | A | * | 5/1951 | Roach et al. ................... | 60/242 |
| 2,637,973 | A | * | 5/1953 | Lawrence, Jr. ................ | 60/259 |
| 2,957,307 | A | * | 10/1960 | Brandenberger et al. ....... | 60/253 |
| 3,059,425 | A | * | 10/1962 | McSherry et al. .............. | 60/242 |
| 3,073,112 | A | * | 1/1963 | Bleikamp, Jr. ................. | 60/242 |
| 3,112,612 | A | * | 12/1963 | Berman et al. ................. | 60/228 |
| 3,150,485 | A | * | 9/1964 | Hickerson ...................... | 60/258 |
| 3,151,446 | A | * | 10/1964 | Parilla .......................... | 60/219 |
| 3,192,714 | A | * | 7/1965 | Hickerson ...................... | 60/230 |
| 3,234,731 | A | * | 2/1966 | Buergin ........................ | 60/258 |
| 3,302,890 | A | * | 2/1967 | Silver ..................... | 239/265.31 |
| 3,427,809 | A | * | 2/1969 | Lavoie .......................... | 60/231 |
| 3,514,957 | A | * | 6/1970 | Evans ........................... | 60/768 |
| 3,608,312 | A | * | 9/1971 | Miltenberger ................ | 60/204 |
| 3,699,772 | A | * | 10/1972 | Elverum, Jr. ................. | 60/258 |
| 3,710,574 | A | * | 1/1973 | Pearson ........................ | 60/258 |
| 3,722,219 | A | * | 3/1973 | Spencer ........................ | 60/258 |
| 3,726,480 | A | * | 4/1973 | Miltenberger .......... | 239/265.19 |
| 3,871,173 | A | * | 3/1975 | McKenna ..................... | 60/258 |

(Continued)

OTHER PUBLICATIONS

Sutton, G.P., "Nozzle Theory and Thermodynamic Relations," *Rocket Propulsion Elements: An Introduction to the Engineering of Rockets,* Sixth Edition, 1992, Chapter 3, Section 8, p. 82.

(Continued)

*Primary Examiner*—William H Rodríguez

(57) ABSTRACT

The thrust of a rocket motor can be varied while maintaining efficiency over a range of pressure ratios using a design that allows for changing the relative position of a plug and a combustion chamber exit. The plug or the chamber exit may be attached to an adaptive control system for position modification. The plug may be positioned in a plug nozzle configuration or in an expansion-deflection (ED) configuration. In either configuration, the elongated downstream portion of the plug allows for efficiency over a wide range of pressure ratios, while ability to change plug position with respect to the chamber exit allows adjustment of rocket thrust.

15 Claims, 3 Drawing Sheets

U.S. PATENT DOCUMENTS

| | | | | |
|---|---|---|---|---|
| 3,897,008 | A | | 7/1975 | Dettling et al. ............. 239/410 |
| 3,940,067 | A | * | 2/1976 | Cherry et al. .......... 239/265.11 |
| 3,948,042 | A | * | 4/1976 | Beardsley et al. ............. 60/242 |
| 4,244,294 | A | * | 1/1981 | Frignac et al. ............... 102/374 |
| 4,269,659 | A | * | 5/1981 | Goldberg .................... 376/107 |
| 4,478,040 | A | * | 10/1984 | Johnson ....................... 60/225 |
| 4,777,795 | A | * | 10/1988 | Le Corre et al. .............. 60/234 |
| 4,817,892 | A | * | 4/1989 | Janeke ......................... 244/15 |
| 5,154,352 | A | * | 10/1992 | Buckreus ................. 239/127.1 |
| 5,394,690 | A | * | 3/1995 | Arszman et al. .............. 60/233 |
| 5,826,794 | A | * | 10/1998 | Rudolph ............... 239/265.17 |
| 6,003,301 | A | * | 12/1999 | Bratkovich et al. ........... 60/204 |
| 6,170,257 | B1 | * | 1/2001 | Harada et al. ................. 60/242 |
| 6,213,431 | B1 | * | 4/2001 | Janeke ..................... 244/171.1 |
| 6,220,852 | B1 | * | 4/2001 | Moore ........................... 431/8 |
| 6,233,919 | B1 | * | 5/2001 | Abel et al. .................... 60/204 |
| 6,293,091 | B1 | * | 9/2001 | Seymour et al. .............. 60/225 |
| 6,591,603 | B2 | | 7/2003 | Dressler et al. ............... 60/258 |
| 6,629,416 | B1 | * | 10/2003 | Johnson ....................... 60/770 |
| 6,964,154 | B1 | * | 11/2005 | Sackheim et al. ............. 60/224 |
| 6,986,246 | B2 | * | 1/2006 | Fujita ........................... 60/242 |
| 7,155,898 | B2 | * | 1/2007 | Sota et al. ..................... 60/230 |
| 7,481,038 | B2 | * | 1/2009 | Blozy et al. ................... 60/228 |
| 2007/0163227 | A1 | * | 7/2007 | Mano et al. ................ 60/200.1 |

OTHER PUBLICATIONS

Sutton, G.P., "Liquid Propellant Rocket Engine Systems and Components," *Rocket Propulsion Elements: An Introduction to the Engineering of Rockets,* Sixth Edition, 1992, Chapter 10, Section 9, p. 359.

Sutton, G.P., "Solid Propellant Rocket Fundamentals," *Rocket Propulsion Elements: An Introduction to the Engineering of Rockets,* Sixth Edition, 1992, Chapter 11, Section 3, pp. 390-399.

Sutton, G.P., "Solid Propellant Rocket Fundamentals," *Rocket Propulsion Elements: An Introduction to the Engineering of Rockets,* Second Edition, 1958, Chapter 9, pp. 305-330.

Huzel, D.K. et al., "Design of Thrust Chambers and Other Combustion Devices," *Design of Liquid Propellant Rocket Engines,* Second Edition, 1967, 89-95.

Ostrander, M.J. et al., "Pintle Motor Challenges for Tactical Missiles," *36th AIAA/ASME/SAE/ASEE Joint Propulsion Conference and Exhibit,* AIAA 2000-3310, Huntsville, Alabama, Jul. 16-19, 2000, 1-12.

Besnard, E. et al., "Development and Flight-Testing of Liquid Propellant Aerospike Engines," *AIAA,* 2004, 04-3354, 1-10.

Hagemann, G. et al., "Flow Phenomena in Advanced Rocket Nozzles—The Plug Nozzle," *AIAA,* 1998, A98-35327, 1-12.

Ito, T. et al., "Computations of the Axisymmetric Plug Nozzle Flow Fields: Flow Structures and Thrust Performance," *AIAA,* 1999, 99-3211, 768-778.

Margraves, C., "Computer Simulation Helps Optimize Design of Innovative Rocket Motor," *Journal Articles by Fluent Software Users,* 2002, JA167, 3 pages.

Ruf, J. et al., "Experimental Results for an Annular Aerospike Nozzle with Differential Throttling," *52nd JANNAF Propulsion Meeting/1st Liquid Propulsion Subcommittee Meeting,* May 2004, 1-21.

Schaefer, R.L. et al., "The Isentropic Spike Nozzle for Trajectory Control of Solid Propellant Rockets," *Hercules Powder Company,* 1960, 203-225.

\* cited by examiner

SYSTEMS AND METHODS FOR VARYING THE THRUST OF ROCKET MOTORS AND ENGINES WHILE MAINTAINING HIGHER EFFICIENCY USING MOVEABLE PLUG NOZZLES

CROSS-REFERENCE TO RELATED APPLICATIONS

This application claims the benefit of U.S. Provisional Application No. 60/547,959 filed on Feb. 27, 2004 entitled "Variable Thrust Solid Propellant Rocket Motor With Shaped Plug Nozzle."

STATEMENT OF GOVERNMENT SUPPORT

This invention was made with Government support under W31P4Q-04-C-R112 awarded by US Army Aviation and Missile Command. The Government has certain rights in the invention. More specifically, this invention was conceived by the inventors without any Government support, during the proposal phase of the above contract, and may be reduced to practice with Government support under the above contract.

FIELD OF THE INVENTION

This invention relates to rocket propulsion, and more particularly to controlling the thrust of a rocket engine or rocket motor and maintaining the thrust efficiency of the system.

BACKGROUND OF THE INVENTION

Modern rocket propulsion systems can be classified according to the type of energy source: chemical, nuclear, and solar. Chemical rocket propulsion uses the energy from a high-pressure combustion reaction of propellant chemicals, which heats reaction product gases to very high temperatures. These gases are then expanded in a nozzle and accelerated to very high velocities, which, in turn, bring rockets to high velocities in an opposite direction. Nuclear propulsion, using a fission reactor, a fusion reactor, or directed radioactive isotope decay, has been investigated but remains largely undeveloped. Solar propulsion may use solar panels to heat a gas. The expanded gas can be expelled through an exhaust nozzle, as with chemical propulsion.

Chemical propulsion techniques are typically divided among those using liquid propellants and those using solid propellants. Gaseous propellants and hybrid propellant systems also exist. Typically, liquid propellant rocket engines feed a propellant under pressure from tanks into a combustion chamber. Solid propellant engines, in contrast, store a propellant "grain" in the combustion chamber, the exposed surface of which burns smoothly at a predetermined rate. Combustion chamber conditions therefore vary with propellant type. The techniques applied to control thrust of the various types of rocket engines historically vary to accommodate for the different mechanics of liquid versus solid propellants. Methods for optimizing nozzle efficiency are more developed in the field of liquid propellant engines than in solid propellant motors.

Methods for initiating and stopping liquid propellant rocket engines and for varying the thrust of these liquid engines during operation and flight are described in U.S. Pat. No. 3,897,008; granted Jul. 29, 1975, to Donald G. Nyberg and Ronald F. Dettling entitled "Liquid Fuel Injector System" which is hereby incorporated by reference in its entirety.

Systems providing improved efficiency for liquid rocket engines using expansion-deflection (ED) nozzles and plug nozzles are described in Huzel, Dieter K. and Huang, David H., Design of Liquid Propellant Rocket Engines. Washington D.C.: NASA Science and Technical information Office, 1967, pp. 89-95. The plug nozzle replaces a traditional nozzle exit cone with a spike centerbody. Exiting gases pass through a throat, and then travel down the surface of the spike to converge in a direction opposite that of rocket trajectory.

The use of an ED nozzle is elaborated in Sutton, George P.; Rocket Propulsion Elements, 6th Edition, John Wiley and Sons (1992). As stated therein, "[t]his behavior is desirable at low altitudes because the atmospheric pressure is high and may be greater than the pressure of the exhaust gases. When this occurs, the exhaust is forced inward and no longer exerts force on the nozzle walls, so thrust is decreased and the rocket becomes less efficient. The centerbody, however, increases the pressure of the exhaust gases by squeezing the gases into a smaller area thereby virtually eliminating any loss in thrust at low altitude."

Liquid propellant engines have improved performance over a wide range of pressure ratios using systems such as those described in Sutton and Huzel and Huang. A recent improvement is described in U.S. Pat. No. 6,591,603 B2, granted Mar. 13, 2003 to Gordon A. Dressier, Thomas J. Mueller, and Scott J. Rotenberger, entitled "Pintle Injector Rocket With Expansion-Deflection Nozzle" (hereinafter "Dressler"). Dressler describes a liquid rocket engine with a variable thrust injector and an ED nozzle to improve performance. In the Dressler system, a throat is formed at one end of a combustion chamber through which hot gases escape. A rod runs through the throat, and a deflector is formed at the end of the rod, downstream of the throat. A nozzle exit cone extends from the throat. Thus, exiting gases pass through the throat and are deflected by the deflector. The deflected gases then pass along the walls of the nozzle exit cone, which direct them in a direction opposite the trajectory of the rocket.

While systems such as the above have improved liquid engine rocketry, no liquid rocket engine design has adequately leveraged improved techniques to provide a simple and powerful engine with both high efficiency over a wide range of backpressures and easily controlled thrust. Such an efficient and versatile rocket engine would provide significant gains in many rocketry applications.

Techniques such as those described above are less developed in the field of solid propellant rocket motors. Designs for use in future generation Army tactical missiles have been investigated and tested, as reported in Burroughs, Susan L. et al, "Pintle Motor Challenges for Tactical Missiles", AIAA Paper 2000-3310, July 2000. These designs use a pintle that extends into the throat or just upstream of the throat of a conical expansion nozzle. The pintle is attached to a control system that can move the pintle forwards and backwards within the combustion chamber, thereby varying the throat area. The size of the throat area is related to chamber pressure and thrust of the solid rocket motor. After passing through the variable throat area, the exhaust gases are expanded in a conventional nozzle (e.g., conical, bell, Rao, etc) to produce thrust against the walls of the nozzle. A "nozzle pressure ratio" commonly used to characterize the conditions under which a rocket operates is the ratio of internal chamber pressure to external (ambient) pressure against which the rocket exhausts.

Conventional rocket nozzles must be designed to optimize nozzle efficiency at a given nozzle pressure ratio. Nozzle performance (i.e., the efficiency with which a nozzle converts thermal energy of the heated gases in the chamber into thrust-producing, directed kinetic energy of the exhausted gases) typically degrades at nozzle pressure ratios other than the "design," or optimal, pressure ratio.

As an example, consider a rocket with a constant chamber pressure, a fixed throat area and a conical nozzle which is used to launch a payload through the earth's atmosphere. As the rocket ascends, the ambient pressure into which the motor exhausts (atmospheric pressure) will decrease, thus increasing the nozzle pressure ratio. Nozzle efficiencies at pressure ratios other than the design ratio will be lower than optimal, so rocket designers must choose the pressure ratio "design point" to give the best average performance over the range of expected pressure ratios.

A class of nozzles called "plug" nozzles or "aerospikes," with a fixed-position centerbody, or spike, that extends downstream of the combustion chamber throat, have the characteristic that nozzle efficiency remains relatively high as a rocket motor with a constant chamber pressure moves through varying ambient pressure conditions. These nozzles are therefore known as "altitude compensating" nozzles.

Nozzles with moveable pintles affect nozzle pressure ratio in a different way, but suffer nonetheless from loss of nozzle efficiency at "off-design" pressure ratios. In this class of nozzles, the pintle is used to vary the throat area, and thus the thrust of solid propellant motors. In varying throat area, these nozzles vary the chamber pressure, and thus the propellant burn rate, with the ultimate effect of varying thrust. However, because the pintle is used in combination with a cone nozzle, varying pressure ratios force rockets of such a design to operate at sub-optimal pressure ratios. Thus thrust control, or "throttling" is achieved at the cost of nozzle efficiency.

Thus, theory and test results demonstrate that the tested designs cannot maintain high performance over a wide range of nozzle pressure ratios. This is largely because such designs suffer from efficiency losses due to expansion problems in a fixed nozzle exit cone or bell nozzle configuration. Regardless of whether the change in nozzle pressure ratio occurs because of decreasing exhaust pressure (increasing altitude) or decreasing chamber pressure (thrust throttling), nozzle efficiency suffers due to non-optimal nozzle expansion at off-design nozzle pressure ratios. Performance losses of up to 30% off of optimal efficiency can occur at off-nominal pressure ratios. To date, no method has been identified for maintaining near-optimal nozzle efficiency while varying thrust over a wide range.

In summary, both liquid and solid rocket motor designs have failed to realize their full potential in providing both high efficiency over a wide range of pressure ratios, and thrust control. Such an efficient and versatile solid, liquid, or other propellant type rocket would provide significant gains for rockets used for commercial and military spacecraft launches, as well as missile launches used for both conventional and anti-terrorism warfare.

SUMMARY OF THE INVENTION

In consideration of the above-identified aspects of rocket design, the present invention provides systems and methods for varying the thrust of a rocket while maintaining significantly higher nozzle efficiency over the thrust range. A moveable plug design is provided for use in rocket motors and engines. The plug may be part of a "moveable plug" nozzle, where a combustion chamber exit, such as a cowl, and plug are moveable with respect to one another. A plug or combustion chamber exit may be attached, or otherwise operably coupled, to an adaptive control system for modifying their position with respect to one another. The adaptive control system may thus control the thrust force and thrust direction of a rocket. At least two configurations employing a moveable plug are described: a first configuration provides a moveable plug in a plug nozzle configuration, while a second configuration provides a moveable plug in an expansion-deflection (ED) configuration. The plug and spike operate to achieve greatly improved efficiency over a wide range of pressure ratios. Other advantages and features of the invention are described below.

BRIEF DESCRIPTION OF THE DRAWINGS

The systems and methods for improved thrust efficiency and control in accordance with the present invention are further described with reference to the accompanying drawings in which.

DETAILED DESCRIPTION OF ILLUSTRATIVE EMBODIMENTS

Certain specific details are set forth in the following description and figures to provide a thorough understanding of various embodiments of the invention. Certain well-known details often associated with the design and manufacture of rocket motors are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods may be described with reference to steps and sequences in the following disclosure, the description as such is for providing a clear implementation of embodiments of the invention, and the steps and sequences of steps should not be taken as required to practice this invention.

Figure 1:
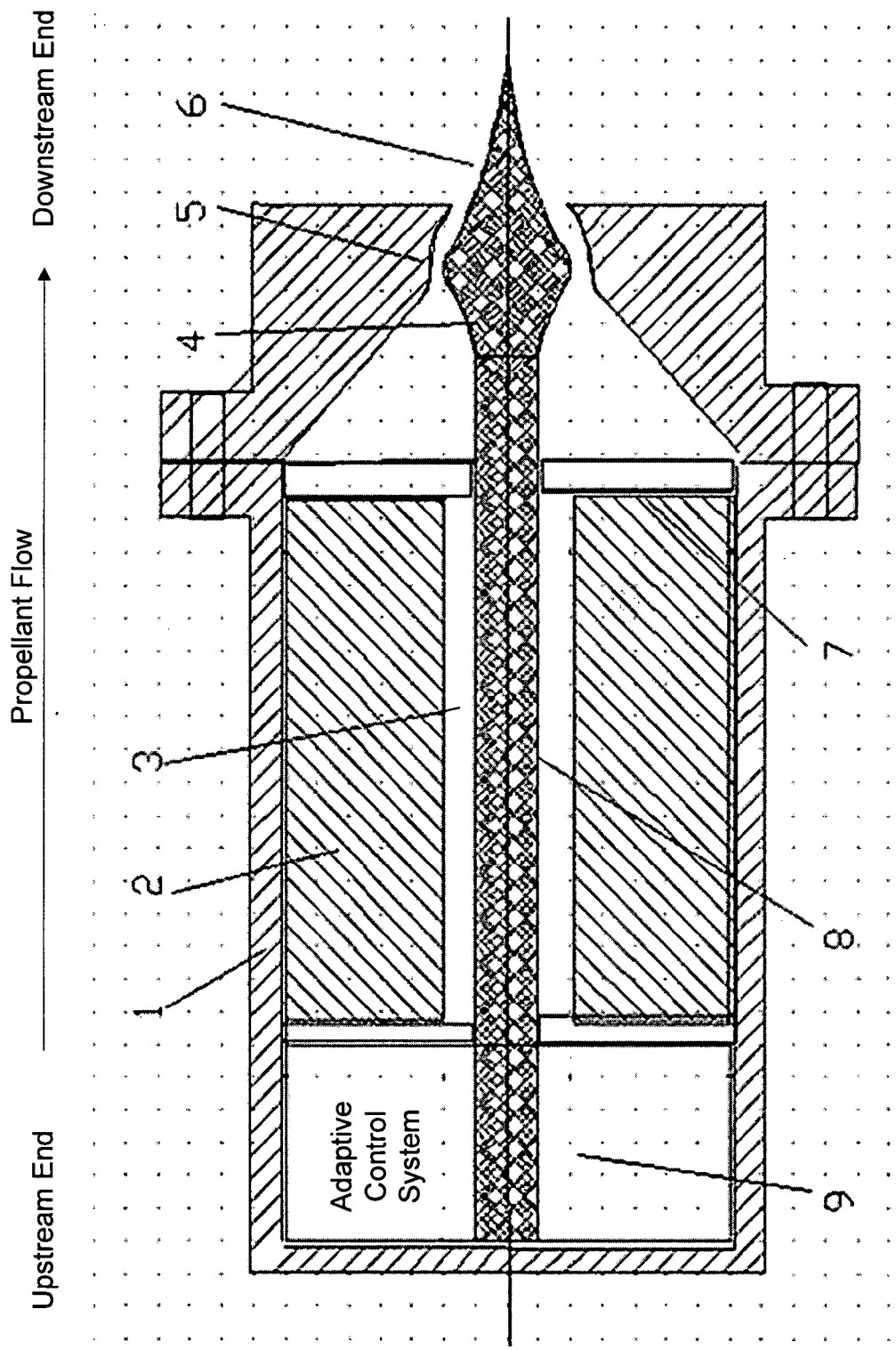
FIG. 1 illustrates an exemplary embodiment of a rocket motor 1 with a moveable plug 4 in a plug nozzle configuration. The position of a plug 4 can be modified with respect to a combustion chamber exit 5. A combustion chamber 3 is illustrated, and an exit 5 is formed at a nozzle end of the combustion chamber 3. The position of the plug 4 is modifiable by the adaptive control system 9.

FIG. 1 demonstrates a cross-sectional view of an exemplary rocket motor 1 that employs various features for improved thrust control and efficiency. The exemplary motor 1 depicted in FIG. 1 has features of a solid-propellant rocket motor. Namely, the motor 1 has a solid propellant grain 2 depicted by the left-to-right diagonal shading. While a solid propellant rocket motor is used herein for illustration purposes, it will be recognized that many aspects of the invention are applicable to liquid engines, solar engines, or indeed any rocket engine or motor that makes use of a combustion chamber 3 and throat 5 arrangement to provide thrust. To emphasize the wide applicability of the invention, the traditional nomenclature that refers to liquid propellant rocket thrust providers as "engines", while referring to the thrust provider of solid propellant rockets as a "motor" is dispensed with here. Hereafter, the terms "engine" and "motor" will be used interchangeably to refer to all types of rocket thrusters using all types of propellants.

The solid propellant grain 2 and its burning surface are contained within a combustion chamber 3. When ignited, the surface of the grain 2 burns, providing hot gases from the burning surface. The burn rate of the propellant 2 affects the flow rate of gas through the exit 5. A faster burn rate will force more gases through the exit 5. The burn rate is dependent on the pressure in the combustion chamber 3. At higher pressures, the propellant 2 burns faster.

The chamber pressure, in turn, is dependent on the nozzle throat area. Nozzle throat area is defined as the smallest space through which exhaust gases must pass to exit the combustion chamber 3. In the embodiment of FIG. 1, nozzle throat area is the smallest annular space between the exit 5 and plug 4. The term "throat plane" refers to the plane that passes through the throat. Note that the position of the throat and throat plane may change, in some embodiments, when the position of the plug 4 is modified with respect to the exit 5. More importantly, the throat area will change in size and/or shape when the plug 4 position, or the exit 5 position is modified. This causes a decrease or increase in combustion chamber 3 pressure, which causes a decrease or increase in burn rate of the grain 2, which forces less or more gas through the throat 105 and thereby decreases or increases thrust.

The thrust of the rocket motor 1 is based upon the specific impulse of the given propellant 2, the chamber 3 pressure, the area of the throat and the thrust coefficient. The thrust coefficient is the measure of efficiency of the expansion of the exhaust gases and the transfer of their energy to the rocket 1, i.e., the efficiency of the nozzle.

Figure 2:
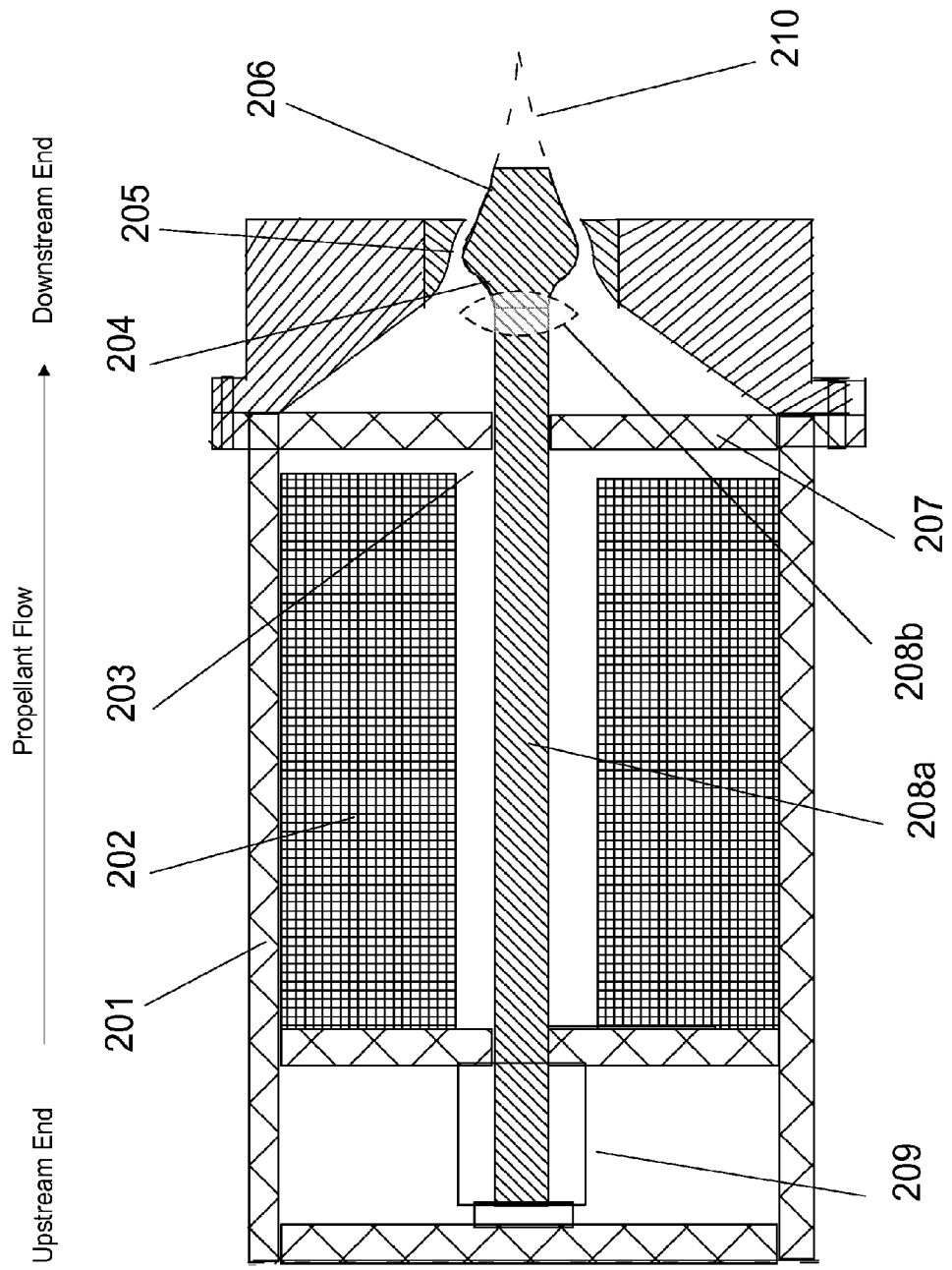
FIG. 2 illustrates a variation of the rocket motor introduced in FIG. 1. The moveable plug 4 is truncated so that it is flattened rather than spiked at the downstream end.
Figure 3:
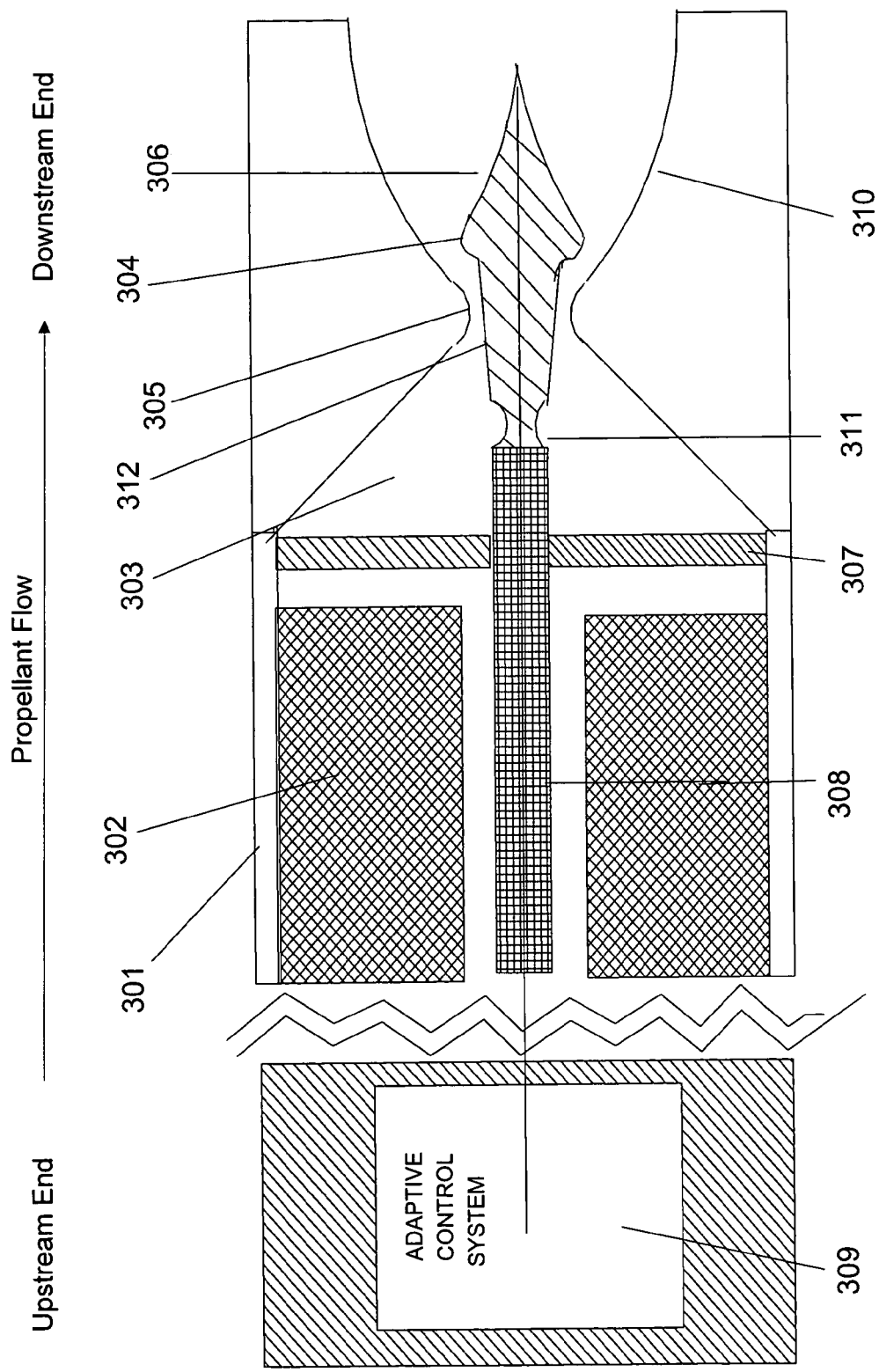
FIG. 3 illustrates an exemplary embodiment of a rocket motor 301 with a moveable plug 304 in an ED nozzle configuration. A moveable plug 304 is positioned substantially downstream of the exit 305. A nozzle cone 310 is added.

The thrust coefficient may change when the rocket motor 1 is operating in different ambient pressures. Differing ambient pressures will effect the ratio of the pressure inside the chamber 3 to the pressure outside the chamber (the nozzle pressure ratio), which affects the dynamics of the gas flow exiting the rocket motor 1. For example, when the rocket motor 1 operates at higher altitudes, the atmospheric pressure decreases, changing the pressure ratio and the corresponding thrust coefficient. Conversely when the chamber pressure is decreased by increasing the nozzle throat area and thus decreasing the propellant burn rate, the nozzle pressure ratio will decrease, thus affecting the nozzle thrust coefficient. The thrust coefficient can be controlled, and maintained at higher levels if desired, in both the high and low backpressure situations by using a moveable plug in a plug nozzle configuration as illustrated in FIGS. 1 and 2 or in an ED nozzle configuration as shown in FIG. 3.

In rocket motor designs contemplated by various embodiments of the invention, a plug 4 is moveable with respect to a combustion chamber exit 5. The relative change in position can be achieved either by moving the plug 4, or by moving the exit 5, or both.

The plug 4 is defined herein as a shaped object roughly in the shape illustrated in. FIGS. 1, 2, and 3. The plug 4 comprises an elongated downstream portion 6, which may come to a point, as illustrated in FIG. 1, or may be truncated as shown in FIG. 2. The shape of plug 4 and spike 6 portion of plug 4 is determined by and optimized for specific propellant types and operational requirements. In FIG. 2, the numeral 206 refers to the truncated elongated downstream portion of plug 204, while the numeral 210 refers to the "missing" spike tip that is present in FIG. 1. A moveable plug may also have shape contours suited to an ED configuration as illustrated in FIG. 3. In FIG. 3, the numeral 306 refers to the elongated downstream portion of plug 304, and the plug 304 also has a tapered front portion for the purpose of changing throat area as plug 304 moves with respect to exit 305.

The plug 4 may be manufactured as a single piece with rod 8, or may be separately fabricated and attached to rod 8. In embodiments without a rod 8, other solutions may be adapted to fit the needs of the particular configuration. The plug 4 may be made from the same material as rod 8 or from some other material; a sturdy heat-resistant material best suited to the propellant and mission is desirable.

The term "exit" as used herein refers to the sidewall substantially overlapping and adjacent to the throat. A portion of an exit 5 may form an outer boundary of a throat. In some embodiments where the exit 5 is a very thin piece, the exit 5 may form the throat without any mass upstream or downstream thereof. In other embodiments, the exit 5 may comprise mass that is adjacent to the throat, while the throat itself comprises an additional component that is coupled to the exit 5. The exemplary exit 5 in FIG. 1 may form a round opening for exhaust gasses to pass through, but may also form an opening of any other shape. Rectangular exits are known in the art and may be used. Similarly, exits may be a variety of sizes and may be manufactured from a variety of materials.

Referring back to FIG. 1, the movement of a plug 4 and/or an exit 5 may be controlled via a range of mechanisms. In the illustrated embodiment, the plug 4 position is controlled by a moveable rod 8. The rod 8 positions the plug 4 within the exit 5. A spike portion 6 may be located downstream of the exit 5. "Downstream," as the term is used here, refers to the stream of exhaust gasses when a rocket engine is in operation. By "in operation," it is understood that the rocket propellant 2 is burning.

Note that rod 8 may be a single straight shaft of any suitable material, as illustrated in FIG. 1. Rod 8 may also be configured in some other fashion employing curvature or multiple converging shafts. The rod 8 is one example of a means for controlling the position of the plug 4, or a portion of such a means, which may be replaced in various embodiments with other means for controlling plug 4 position. Some embodiments may employ electronic control mechanisms such as electromagnetic suspension and control mechanisms, flexible disk diaphragms capable of suspending plug 4, flexible meshes, or other means. Appropriately positioned electromagnets may be employed for carrying out electromagnetic suspension as will be appreciated by those of skill in the art, and an exemplary flexible disk diaphragm or flexible mesh 208b may also be employed as will likewise be appreciated. In embodiments where the plug 4 remains in a fixed position with respect to engine 1, while the position of the exit 5 is moveable with respect to the plug 4, additional techniques may be available for holding the plug 4 in place and modifying the position of the exit 5.

In FIG. 1, as the control system 9 and rod 8 move the plug 4 upstream, the annular restricted throat area is increased. This results in decreased chamber 3 pressure and corresponding decrease in thrust. In the case of a solid propellant, the decreased chamber 3 pressure results in a decreased burn rate of the propellant 2 according to the empirical relation:

$$r_b = aPc^n$$

where $r_b$ is the burn rate at the surface of the propellant, Pc is chamber pressure, and n and a are constants related to specific characteristics of the propellant selected. A decreased burning rate results in a lower flow rate of propellant and a resulting lower thrust. Naturally, reversing the direction of the control system and the movement of the plug increases chamber pressure and corresponding thrust.

Modifying the plug 4 and/or exit 5 position upstream and downstream thus controls the amount of thrust of the rocket engine 1, which as a practical matter affects rocket acceleration and velocity. Upstream and downstream position modification of the plug 4 and exit 5 with respect to one another is referred to herein as axial motion. Thus if either plug 4 or exit 5 is moved directly upstream or directly downstream, the movement is considered axial. In contrast, moving the plug 4 or exit 5 from side-to-side affects direction of thrust, which correspondingly affects the rocket direction. Such movement will be referred to herein as radial movement. Thus, modification of the axial and radial position of plug 4 and/or exit 5 can be used to alter both rocket speed and direction. Accordingly, position control system 9 and rod 8 may comprise apparatus for moving the plug 4 and/or exit 5 both axially-and radially.

Position changes of the plug 4 may be accomplished via a position control system 9. The position control system 9 is depicted upstream of the combustion chamber 3 in FIG. 1, however various embodiments may place it downstream, to one side, or in some other location with respect to the combustion chamber 3.

Examples of position control systems such as 9 are presently in use in connection with rockets that use a pintle to modify rocket thrust. Any presently used or future developed position control system 9 is considered appropriate for use in connection with practicing the invention.

The function of the position control system 9 may be simply to adapt to ambient pressures to provide a predictable rocket speed, or may be more sophisticated. Sophisticated systems might make use of computerized controls that are capable of communicating with a computer operated by a human or automated response system. In such configurations, a human might remotely control the trajectory of a rocket by sending signals to 9, which in turn modifies the position of the plug 4 to carry out the human instructions. An automated network could also perform the task of the human. Many scenarios might be constructed in which the benefits of such a system are evident. One such scenario might involve the automatic adjustment the position of plug 4 with respect to exit 5 to account for erosion of the plug 4, exit 5, or other nozzle surfaces as the propellant 2 burns, and thus compensate for changes in the nozzle throat area and contours during rocket motor operation.

Note that position control system 9 can modify the position of the plug 4 with respect to the exit 5 of the combustion chamber 3. Note that when plug 4 is moved from a larger diameter portion of the exit 5 to a smaller diameter portion of the exit 5, either by moving plug 4 downstream or exit 5 upstream, the throat area is reduced, and vice versa. Changes in throat area may be accomplished by moving the plug 4 or by moving the exit 5. Embodiments in which the exit 5 is moved while the plug 4 remains fixed with respect to the other components of the rocket, such as sidewall 1 and support brace 7 can be implemented by mounting the exit 5 to the remainder of rocket 1 via a flexible apparatus, and by controlling the motion of the exit 5 using the position control system 9.

Support brace 7 may be included in various embodiments to support the appropriate position of the moveable plug 4 with respect to the exit 5. In embodiments where the moveable plug 4 can only move axially, support brace 7 can fit around the rod 8 snugly, but not so tight as to prevent axial sliding. In embodiments where the plug 4 can move radially as well as forward and backward, support wall may be outfitted with additional apparatus to support the rod 8 in the desired position. Such additional apparatus may be independent of the position control system 9 or may be operably coupled to 9 to act in concert with the positioning activities of adaptive control system 9.

The shape of spike 6 will effect the dynamics of exhaust gases and so is a feature for close consideration in practicing the invention. In particular, the plug 4 and spike portion 6 thereof may vary depending on whether a plug nozzle, truncated plug nozzle, or ED nozzle type is used. A plug nozzle configuration is illustrated in FIG. 1, a truncated plug nozzle is illustrated in FIG. 2, and an ED nozzle is illustrated in FIG. 3. Note that despite the different operational mechanics of the configuration illustrated in FIGS. 1, 2, and 3, each comprises a plug and exit with modifiable relative position.

Referring to FIG. 2, many elements similar to those of FIG. 1 are illustrated, including the motor 201, grain 202, combustion chamber 203, plug 204, exit 205, elongated downstream portion of plug 206, brace 207, rod 208*a*, and position control system 209. The exit 205 is illustrated as a separate piece that is inserted into the surrounding housing. The spike 206 portion of plug 204 is truncated, as indicated by the "missing" spike point 210. The essential action of the spike 206 may be approximated by fluid-mechanical behavior of the propellant downstream of the truncated plug 204. Truncation has been used in various fixed-plug nozzle designs, and results in what is known as a truncated aerospike. Aerospike configurations may work well in the context of moveable plugs provided herein. The advantage of a truncated aerospike is that much of the effect of a pointed spike, such as that illustrated in FIG. 1, may be achieved without the additional mass of the spike tip 210.

The plug nozzle configuration will maintain nozzle efficiency at low flow rates and/or low altitudes where relatively high back pressure causes boundary layer separation and attendant thrust loss in conventional cone and bell nozzles. By contrast, at a low chamber pressure, low thrust condition using the standard upstream pintle design, the exhaust gases do not expand fully into the nozzle but form a core in the center of the nozzle. With a moveable plug, however, the plume does not suffer from efficiency-reducing boundary-layer separation at low chamber pressure (low nozzle pressure ratio), and thus the efficiency of the nozzle can be near-optimized at these reduced-flow conditions.

Referring to FIG. 3, the use of a moveable plug 304 is illustrated in the context of an ED nozzle configuration. The plug 304 is shaped somewhat differently to accommodate the ED nozzle. Note, however, that several important advantages accrue from using a moveable plug 4 with elongated downstream portion 306 in the place of the traditional fixed ED nozzle deflector.

FIG. 3 illustrates embodiments of a design variation that employs some of the elements of FIG. 1 in a somewhat different setting. A cross section of an exemplary solid propellant motor 301 is depicted. The grain 302, combustion chamber 303, support brace 307, rod 308, and adaptive control system 309 will also be recognized as similar to elements from FIG. 1. The motor 301 employs an expansion-deflection configuration with a shaped plug 304. The shaped plug 304, like the other plugs depicted herein, is both moveable with respect to exit 305, and comprises an elongated downstream portion 306, that is numbered separately for the purpose of any specific discussion of that portion of the plug 304. In the ED configuration, a tapered rod 312 may be employed upstream of the plug 304. As with the motor 1 of FIG. 1, the throat area in FIG. 3 can be controlled by modifying the position of plug 304 with the tapered rod 312. When such modification results in a decrease in throat area, the resulting increased burning rate creates a higher flow rate of propellant and a correspondingly higher thrust. Conversely, when the throat area is increased, a decreased burning rate or smoldering results, producing a correspondingly lower thrust or cessation of thrust. The shaped plug 304 with elongated downstream portion 306 downstream of the exit 305 can serve to maintain higher overall nozzle efficiency as the thrust, and therefore pressure ratio, is varied.

Reversing the direction of the control system 309 and the movement of the plug 304 and tapered rod 312 reduces the combustion chamber 303 pressure and the thrust. The chamber pressure can be reduced to near extinguishment (smoldering) or to complete extinguishment by including a notched area 311 upstream of the tapered rod 312. By positioning the notched area 311 in the exit 305, the throat area may be increased to a value sufficient for complete extinguishment of a solid propellant grain. In the illustrated embodiment, the plug 304 tapered rod 312, and notched area are controlled via rod 308 and adaptive control system 309, although any other available means may be used to modify the relative position of notch 311, tapered rod 312, and plug 304 with respect to exit 305, as discussed above.

In embodiments such as FIG. 3, the plug 304 directs the flow of exhaust products to the outer walls of the nozzle 310 even at low exhaust pressure ratios. The hot gases are expanded to the ambient atmosphere around the plug 304 which directs the flow to the outer nozzle walls 10 in a cone or bell exhaust nozzle 310 to provide thrust to the rocket. The elongated downstream portion, or spike 306, extends downstream of plug 304 to provide efficient exhaust dynamics at pressure ratio ranges that cause gases to cling to the walls of the spike 306. Thus the spike 306 and the expansion-deflection arrangement complement each other to the extent that they affect exhaust dynamics in overlapping ranges. The spike 306 and the ED arrangement extend the thrust efficiency to the extent that they do not affect overlapping pressure ratio ranges.

A control system 309 can provide the correct positioning of the moveable plug 304, tapered rod 312, and/or notch 311 in the exit 5 to produce the desired thrust. As with the position control system 109 from FIG. 1, system 309 may be upstream or downstream of the combustion chamber 303, may be similar to presently-used systems to control pintles in solid-propellant rocketry (or some future developed position control technology), may be preconfigured to react predictably to atmospheric conditions or remotely controllable, and may operate to modify the position of the plug 304 or the position of the exit 305, or both.

The remaining elements, e.g., sidewall 301, grain 302, and support brace 307 are generally analogous to the corresponding elements from FIG. 1. Please refer to the discussion of those elements above for a description of the function of various embodiments of these features of a rocket motor incorporating aspects of the invention.

Although exemplary embodiments refer to utilizing the present invention in the context of solid-propellant rocket motors, the invention is not so limited, but rather may be implemented in connection with any rocket motor configuration in which thermal energy is converted to directed kinetic energy, and thus thrust, by means of a nozzle. Therefore, the present invention should not be limited to any single embodiment, but rather should be construed in breadth and scope in accordance with the appended claims.

We claim:

1. A rocket motor with a combustion chamber configured such that a propellant will flow out of the combustion chamber in a downstream direction, said rocket motor comprising:
   an exit formed at a downstream end of said rocket motor wherein the exit forms a rectangular opening;
   a plug with an elongated downstream portion;
   a position control apparatus that modifies a relative position of the plug and the exit, said position control apparatus interacting with an electromagnetic suspension mechanism, a flexible disk diaphragm, or a flexible mesh to control a position of said plug.

2. The rocket motor of claim 1 wherein said elongated downstream portion converges to form a spike.

3. The rocket motor of claim 1 wherein said elongated downstream portion is truncated.

4. The rocket motor of claim 1 wherein the propellant is in a solid state prior to combustion.

5. The rocket motor of claim 1 wherein said plug is positioned within said exit in an expansion-deflection (ED) nozzle configuration.

6. The rocket motor of claim 1, wherein said position control apparatus comprises a rod that extends from an upstream portion of said rocket motor.

7. A rocket motor with a combustion chamber configured such that a propellant will flow out of the combustion chamber in a downstream direction, said rocket motor comprising:
   an exit formed at a downstream end of said rocket motor;
   a plug with an elongated downstream portion, wherein said plug is positioned within said exit in an expansion-deflection (ED) nozzle configuration;
   a tapered rod upstream of said plug; and
   a position control apparatus that modifies a relative position of the plug and the exit, said position control apparatus interacting with an electromagnetic suspension mechanism, a flexible disk diaphragm, an electronic control mechanism, or a flexible mesh to control a position of said plug.

8. A rocket motor with a combustion chamber configured such that a propellant will flow out of the combustion chamber in a downstream direction, said rocket motor comprising:
   an exit formed at a downstream end of said rocket motor;
   a plug with an elongated downstream portion, wherein said plug is positioned within said exit in an expansion-deflection (ED) nozzle configuration;
   a notched rod upstream of said plug; and
   a position control apparatus that modifies a relative position of the plug and the exit, said position control apparatus interacting with an electromagnetic suspension mechanism, a flexible disk diaphragm, an electronic control mechanism, or a flexible mesh to control a position of said plug.

9. An apparatus for controlling thrust of a rocket motor with a combustion chamber configured such that a propellant will flow out of the combustion chamber in a downstream direction, said apparatus comprising:
   a plug means that is positioned within an exit in an expansion-deflection (ED) nozzle configuration;
   a tapered rod means upstream of said plug means;
   an elongated downstream portion of said plug means, said elongated downstream portion forming a nozzle for imparting thrust to said rocket motor
   a position modification means for axially modifying the relative position of said plug and the exit through which the propellant passes as it departs the combustion chamber, said position modification means interacting with an electromagnetic suspension mechanism, a flexible disk diaphragm, an electronic control mechanism, or a flexible mesh to control a position of said plug.

10. The apparatus for controlling thrust of a rocket motor of claim 9 wherein the propellant is in a solid state prior to combustion.

11. An apparatus for controlling thrust of a rocket motor with a combustion chamber configured such that a propellant will flow out of the combustion chamber in a downstream direction, said apparatus comprising:

a plug means that is positioned within an exit in an expansion-deflection (ED) nozzle configuration;

a notched rod means upstream of said plug means;

an elongated downstream portion of said plug means, said elongated downstream portion forming a nozzle for imparting thrust to said rocket motor;

a position modification means for axially modifying the relative position of said plug and the exit through which the propellant passes as it departs the combustion chamber, said position modification means interacting with an electromagnetic suspension mechanism, a flexible disk diaphragm, an electronic control mechanism, or a flexible mesh to control a position of said plug.

12. A rocket motor with a combustion chamber configured such that a propellant will flow out of the combustion chamber in a downstream direction, said rocket motor comprising:

an exit formed at a downstream end of said rocket motor wherein said exit is formed as a separate piece that is attached to a surrounding housing;

a plug with an elongated downstream portion;

a position control apparatus that modifies a relative position of the plug and the exit, said position control apparatus interacting with an electromagnetic suspension mechanism, a flexible disk diaphragm, or a flexible mesh to control a position of said plug.

13. A rocket motor with a combustion chamber configured such that a propellant will flow out of the combustion chamber in a downstream direction, said rocket motor comprising:

an exit formed at a downstream end of said rocket motor;

a plug with an elongated downstream portion;

a position control apparatus that modifies a relative position of the plug and the exit, said position control apparatus interacting with an electromagnetic suspension mechanism, a flexible disk diaphragm, an electronic control mechanism, or a flexible mesh to control a position of said plug;

wherein said position control apparatus includes computerized controls that modify said relative position to adapt to ambient pressures to provide a predictable rocket speed.

14. The rocket motor of claim 13, wherein said position control apparatus includes computerized controls that modify said relative position to account for erosion of said plug and said exit.

15. A rocket motor with a combustion chamber configured such that a propellant will flow out of the combustion chamber in a downstream direction, said rocket motor comprising:

an exit formed at a downstream end of said rocket motor;

a plug with an elongated downstream portion;

a position control apparatus that modifies a relative position of the plug and the exit, said position control apparatus interacting with an electromagnetic suspension mechanism, a flexible disk diaphragm, an electronic control mechanism, or a flexible mesh to control a position of said plug;

wherein said position control apparatus includes computerized controls that modify said relative position to cause said rocket motor to smolder.

\* \* \* \* \*